(12) United States Patent
Grimes

(10) Patent No.: US 7,673,922 B1
(45) Date of Patent: Mar. 9, 2010

(54) STEP DEVICE AND METHOD OF USE

(76) Inventor: Gary Robert Grimes, 1992 Bentwood Dr., Floresville, TX (US) 78114-6718

( * ) Notice: Subject to any disclaimer, the term of this patent is extended or adjusted under 35 U.S.C. 154(b) by 0 days.

(21) Appl. No.: 12/283,052

(22) Filed: Sep. 9, 2008

Related U.S. Application Data

(60) Provisional application No. 60/993,607, filed on Sep. 14, 2007.

(51) Int. Cl.
 *B62D 25/00* (2006.01)
(52) U.S. Cl. .......................... 296/62; 280/166
(58) Field of Classification Search .................. 296/62, 296/56, 50, 57.1, 51; 182/187; 280/163, 280/164.1, 166
See application file for complete search history.

(56) References Cited

U.S. PATENT DOCUMENTS

| | | | | |
|---|---|---|---|---|
| 4,021,071 A * | 5/1977 | Norman | ...................... | 296/62 |
| 4,191,388 A * | 3/1980 | Barksdale | ................... | 280/166 |
| 4,848,821 A * | 7/1989 | Llewellyn | .................... | 296/62 |
| 5,028,063 A * | 7/1991 | Andrews | ................... | 280/166 |
| 5,205,603 A * | 4/1993 | Burdette, Jr. | ................. | 296/62 |
| 5,549,312 A * | 8/1996 | Garvert | ....................... | 280/166 |
| 5,687,813 A * | 11/1997 | Bensch | ........................ | 182/127 |
| 5,732,996 A * | 3/1998 | Graffy et al. | .................. | 296/62 |
| 5,820,193 A * | 10/1998 | Straffon | ....................... | 296/62 |
| 6,270,139 B1 * | 8/2001 | Simpson | ...................... | 296/62 |
| 6,422,342 B1 | 7/2002 | Armstrong et al. | | |
| 6,840,526 B2 * | 1/2005 | Anderson et al. | ........... | 280/166 |
| 6,857,680 B2 * | 2/2005 | Fielding | ...................... | 296/62 |
| 7,059,648 B2 * | 6/2006 | Livingston | ................... | 296/62 |
| 7,080,713 B1 * | 7/2006 | Riggs | ......................... | 182/127 |
| 7,090,276 B1 | 8/2006 | Bruford et al. | | |
| 7,448,637 B2 * | 11/2008 | Parker | ........................ | 280/166 |
| D585,350 S * | 1/2009 | Coletti | ....................... | D12/203 |
| 7,516,997 B2 * | 4/2009 | Kuznarik et al. | .............. | 296/62 |
| 2007/0182194 A1 * | 8/2007 | Wood et al. | ................... | 296/62 |
| 2008/0231067 A1 * | 9/2008 | Nagle | .......................... | 296/50 |
| 2009/0072571 A1 * | 3/2009 | Elliott et al. | .................. | 296/62 |

* cited by examiner

*Primary Examiner*—Kiran B. Patel
(74) *Attorney, Agent, or Firm*—Rafael V. Baca; Baca Law Firm, PLLC

(57) ABSTRACT

A step device and method for stepping on or off a tailgate without structurally altering the tailgate. In exemplary embodiment, the step device includes a tailgate step frame and a step assembly pivotally coupled to the tailgate step frame. The tailgate step frame includes at least one frame element in contact with the tailgate and a plurality of strap mounting assemblies for releasably coupling the step device to the tailgate. Each strap mounting assembly compressively fits on the tailgate thereby anchoring the step device to the tailgate. In one aspect, each strap mounting assembly further includes a strap element coupled to the at least one frame element and configured to conform to the predetermined shape of the tailgate. One strap mounting assembly may be interchanged for another of either different shape or dimensions to accommodate a desired compressive fit on any tailgate.

1 Claim, 4 Drawing Sheets

STEP DEVICE AND METHOD OF USE

CROSS REFERENCE TO RELATED APPLICATIONS

This application is related to and claims benefit under 35 U.S.C. §119(e) from prior U.S. Provisional Patent Application Ser. No. 60/993,607 filed on Sep. 14, 2007 entitled "Tailgate Step and Support for Accessing Truck Bed", by inventor Gary Robert Grimes, the entire disclosure of which is hereby incorporated by reference as if fully set forth herein.

BACKGROUND OF THE INVENTION

1. Technical Field

The present invention generally relates to a step assembly for accessing a storage bed, such as among others a pickup truck bed, via a truck tailgate. More particularly, but not by way of limitation, the present invention relates to a device and method for accessing any storage bed by releasably anchoring a step device to the tailgate without structurally altering the tailgate.

2. Description of the Related Art

Illustratively, pickup truck drivers frequently find it necessary to climb into the storage bed area of their trucks to load or unload items. Often these drivers need to access their truck beds on occasional instances and in sometimes remote areas where large or bulky ladders or portable steps are not readily available. Moreover, the difficulty of easily stepping into a truck bed has grown in recent years as four wheel drive and late model pickup trucks are generally higher from the ground than previous models and make it difficult to step on or off these truck beds.

Pickup truck owners often want the utility of a truck and are generally very particular when it comes to altering the appearance, especially when it comes to drilling holes. Most truck owners don't like to drill holes in their trucks or have unsightly devices visibly hanging on the outside of their vehicles. Holes may also lead to corrosion or other structural problems on the tailgate which would displease almost any truck owner.

After comparison with prior art, the present invention herein described identifies any and all improvements, unexpected results, synergies, and other evidence that provides at least one result that is more than what might be predictable to one skilled in the art. Among other unpredictable results, the present invention features a step device for a tail gate for facilitating a universally adaptable, releasable anchoring system that provides a step from a tailgate without structurally altering the tailgate. The present invention addresses this need and other needs unresolved by the prior art.

SUMMARY OF THE INVENTION

A step device and method for stepping on or off a tailgate without structurally altering the tailgate. In one aspect, a step device includes a tailgate step frame and a step assembly pivotally coupled to the tailgate step frame. The tailgate step frame includes at least one frame element in contact with the tailgate and a plurality of strap mounting assemblies for releasably coupling the step device to the tailgate. Each strap mounting assembly compressively fits on the tailgate thereby anchoring the step device to the tailgate. In one aspect, each strap mounting assembly further includes a strap element coupled to the at least one frame element and configured to conform to the predetermined shape of the tailgate. One strap mounting assembly may be interchanged for another of either different shape or dimensions to accommodate a desired compressive fit on any tailgate.

In one aspect, in a deployed position, the step assembly extends outwardly from the tailgate step frame at a predetermined angle relative to the inside surface of the tailgate. The step assembly includes a stop block for operatively abutting the edge of the tailgate thereby supporting the tailgate step frame at a predetermined angle. In one aspect, the step assembly includes at least one telescoping step extending from the tailgate step frame. In one aspect, the tailgate step frame includes a support handle extending outwardly to assist in stepping on a tailgate step frame and ultimately onto a tailgate.

In one aspect, at least one strap mounting assembly from the plurality of strap mounting assemblies includes an adjustable strap mounting assembly. The adjustable strap mounting assembly is variably adjustable to compressively fit on any tailgate.

A method for stepping on or off a tailgate without structurally altering the tailgate may be appreciated. Initially, a tailgate is opened to a flat position in alignment with a storage bed, such as a truck bed. Then, a step device is placed on the outside mounting surface of the tailgate. Specifically, a tailgate step frame including a plurality of strap mounting assemblies is placed on the tailgate. Next, a plurality of strap mounting assemblies are secured along the edge of the tailgate and to the tailgate step frame. The step assembly is rendered to extend outwardly from the tailgate step frame. To discontinue use, the step assembly is retracted toward the tailgate step frame.

The above as well as other aspects, advantages, and novel features of the present invention will become apparent from the following written detailed description of the present invention when considered in conjunction with the accompanying drawings.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
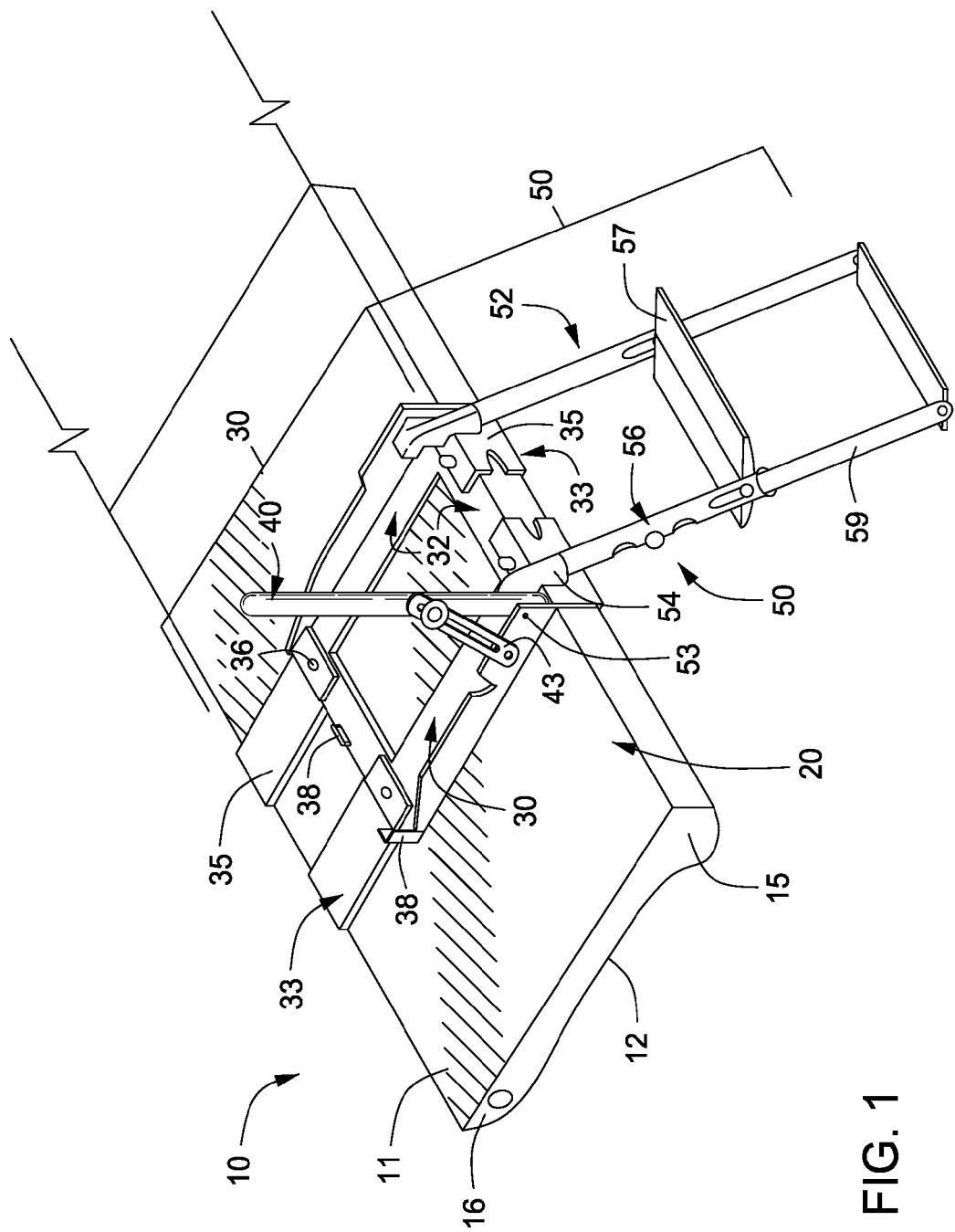
FIG. 1 is schematic view from the side of a step device in a deployed position in accordance with the present invention, the step device includes a step assembly, a support handle, and a tailgate step frame disposed on a tailgate, the tailgate step frame featuring a plurality of strap mounting assemblies to releasably anchor the step device without structurally altering the tailgate, the step assembly and the support handle are shown as extending outwardly from the tailgate step frame to facilitate ease of entry into a storage bed.

The present invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention. Furthermore, when used and unless otherwise stated, terms such as "horizontal," "vertical," "upper," "lower," "front," "rear," "over," and "under," and similar position related terms are not to be construed as limiting the invention to a particular orientation. Instead, such terms are to be construed only on a relative basis reflecting the relative position and orientation of the various components shown in the accompanying depicted embodiments.

The invention is generally directed to a step device and method for accessing any storage bed, such as among others a truck bed, by releasably anchoring the step device to the tailgate of the truck bed without structurally altering the tailgate. In one exemplary embodiment, the step device features a tailgate step frame having a plurality of strap mounting assemblies. The plurality of strap mounting assemblies collectively exert forces against the tailgate of the truck bed to secure the step device to the tailgate as a step assembly is deployed outwardly from the tailgate by the step device.

In general, the plurality of strap mounting assemblies permit secured placement of the step assembly on any tailgate without structurally altering the tailgate such as among others drilling holes, denting, or recessing the step assembly within the tailgate. In one exemplary embodiment, the strap mounting assemblies are interchangeable with one another and removable from tailgate step frame. Illustratively, to compressively fit on a desired tailgate from a particular make and model pickup truck, the tailgate step frame requires a strap mounting assembly with predetermined dimensions for mounting on the desired tailgate. In one exemplary embodiment, the strap mounting assembly includes an adjustable clamp assembly that is variably adjustable to compressively fit on any tailgate. Generally, the plurality of strap mounting assemblies provide for a highly portable step device that is compact, lightweight, and conveniently deployable in remote situations where access to step ladders or other equipment is limited or non-existent.

Generally, a step device further includes a step assembly that extends outwardly from a tailgate step frame at a predetermined angle relative to the inside surface of the tailgate. In operation, the angled step assembly facilitates ease of access to the truck bed as it prevents one's leg from hitting the tailgate while stepping from the step assembly to the truck bed as well as difficulties in locating the step assembly while stepping from the tailgate to a step assembly that hangs directly below the edge of the tailgate.

In one exemplary embodiment, the tailgate step frame includes a support handle. In one exemplary embodiment, the support handle extends substantially vertically from the inside surface of the tailgate to facilitate one's gripping ease.

With reference now to the figures, wherein like reference numerals refer to like and corresponding parts throughout, and in particular with reference to FIG. 1, there is illustrated a depiction of a step device 20 in accordance with the invention. As shown in FIG. 1, the step device 20 is coupled to a tailgate 10. In operation, the step device 20 facilitates stepping onto the tailgate 10 without structurally altering the tailgate 10 such as among others drilling holes, denting, or recessing a step assembly within the tailgate 10.

As shown in FIG. 1, the tailgate 10 comprises a tailgate of a type well known in the industry such as among others a tail gate for a pickup truck or sport utility vehicle (SUV). Those of ordinary skill in the art will readily recognize any suitable tailgate of a type well known in the industry.

As shown, the tailgate 10 includes an inside surface 11 and an outside surface 12. As the tailgate 10 is closed to enclose a storage bed, such as a truck bed, the outside surface 12 is exposed to align with the surrounding autobody. FIG. 1 shows the tailgate 10 open to expose a storage bed (not shown), the inside surface 11 provides a mounting surface for a tailgate step frame 30 the step device 20.

The tailgate 10 further includes a top edge 15 and a bottom edge 16. Operatively, as the tailgate 10 is closed to enclose the storage bed, the bottom edge 16 pivots the tailgate 10 upward so that the top edge 15 aligns with remaining perimeter of the autobody surrounding the storage bed. As shown, in one exemplary embodiment, the top edge 15 is of a different thickness than the bottom edge 16.

FIG. 1 shows the step device 20 coupled to the tailgate 10. The step device 10 generally includes a tailgate step frame 30 and a step assembly 50. As shown, the step assembly 50 is rendered in a deployed position. Accordingly, the step assembly 50 extends outwardly from the tailgate step frame 30 to facilitate easy of entry to the storage bed.

In one exemplary embodiment, the tailgate step frame 30 includes at least one frame element 32. The at least one frame element 32 contacts with the inside surface 11 of the tailgate 10.

For the embodiment of FIG. 1, the tailgate step frame 30 comprises a rectangular frame integrally defined by a plurality of frame elements 32. The frame elements 32 are composed of a rigid material such as a metal, metal alloy or a polymer.

Optionally, in one exemplary embodiment, the tailgate step frame 30 includes an edge projection. The edge projection supplies added mechanical strength to the tailgate step frame 30. Furthermore, the edge projection permits a stowed step assembly to rest against the edge projection as protection from the elements and potential crushing forces exerted on the tailgate step frame 30 while stowed.

Referring to FIG. 1, the tailgate step frame 30 further includes a plurality of strap mounting assemblies 33 for releasably coupling the step device 20 to the tailgate 10 without structurally altering the tailgate 10. In this disclosure and appended claims the term "releasably coupling" refers to facilitating a mechanically secure mounting onto a tailgate but with the ability to removed and placed on another tailgate or similar surface.

Each strap mounting assembly 33 is secured to the at least one frame element 32. The at least one frame element 32, in turn, positions each strap mounting assembly 33 to a desired location on the tailgate step frame 30 so that each strap mounting assembly 33 anchors to the edge of the tailgate 10.

In one exemplary embodiment, the each strap mounting assembly 33 is so dimensioned as to compressively fit on the tailgate 10 thereby anchoring the step device 20 to the tailgate 10. In one exemplary embodiment, each strap mounting assembly 33 features predetermined dimensions to accommodate a compressive fit on a particular tailgate.

Moreover, in one exemplary embodiment, one strap mounting assembly varies in configuration with another strap mounting assembly. As illustratively shown in FIG. 1, the configuration of the strap mounting assemblies 33 at the top edge 15 vary in configuration with the strap mounting assemblies 33 at the bottom edge 16. Inasmuch, one strap mounting assembly can be interchanged for another of different configuration or dimension to optimally fit on a desired tailgate.

With reference to FIG. 1, each strap mounting assembly 33 includes a strap element 35. The strap element 35 is coupled to the tailgate step frame 30 via a corresponding strap fastener 36. Those of ordinary skill in the art will readily recognize any sufficient number and kind of strap fastener for coupling the strap element to the tailgate step frame.

In one exemplary embodiment, the strap element 35 is configured to conform to the predetermined shape of the tailgate 10. As discussed in further detail below, each strap element 35 extends from the tailgate step frame 30 along the tailgate edge toward the outside surface 12 while applying tensile and compressive forces to the tailgate 10.

In one exemplary embodiment, the tailgate step frame 30 includes a support handle 40. As shown in FIG. 1, the support handle 40 is coupled to the at least one frame element 32.

In operation, the support handle 40 extends substantially vertically from the inside mounting surface 11 to facilitate gripping ease, such as among others for manually holding onto. The support handle 40 locks in place in either a substantially vertical position or a stowed position via a handle locking mechanism 43.

The step device 20 further includes a step assembly 50. The step assembly 50 is pivotally coupled to the tailgate step frame 30 via a hinge element 53 secured to the tailgate step frame 30.

In the stowed position, the step device 20 is secured to the tailgate step frame 30 via a step locking mechanism 38. As such, the tailgate step frame includes a plurality of locking mechanisms 38, 43 to respectively secure the step assembly 50 and support handle 40 in place as the step device 20 is rendered in a stowed position.

In a deployed position as shown in FIG. 1, the step assembly 50 extends outwardly from the tailgate step frame 30 at a predetermined angle relative to the inside mounting surface 11 of the tailgate 10. In operation, an angled step assembly 50 facilitates ease of access to a storage bed as it prevents one's leg from hitting the tailgate 10 while stepping from the step assembly 50 toward the tailgate 10 to the storage bed as well as difficulties in locating the step assembly while stepping from the tailgate to a step assembly that hangs directly below the edge of the tailgate.

Illustratively, in one exemplary embodiment, the predetermined angle is at 30° (degrees) from the inside mounting surface 11. Those of ordinary skill in the art will readily recognize any predetermined angle to facilitate ease of access to the storage bed, such as among other a truck bed.

Referring to FIG. 1, the step assembly 50 includes a step 57 and a plurality of primary rail members 52. In one exemplary embodiment, each primary rail member 52 is coupled to the step 57 at opposing sides of the step 57 to ultimately support the step 57 as the step assembly 50 is rendered in a deployed position. Optionally, as shown in the exemplary embodiment of FIG. 1, the step 57 comprises a folding step that pivotally locks in place during use and folds away during storage.

Optionally, in one exemplary embodiment, the step assembly 50 includes a telescoping step 59. The telescoping step 59 extends outwardly from the primary step rail members 52. When not in use, the telescoping step 59 stows below the step 57. The telescoping step 59 operatively shortens one's climb between the ground, the step 57 and the tailgate 10. Those of ordinary skill in the art will readily recognize the step assembly 50 featuring any number of additional steps and step configurations in operative engagement with the step 57.

In one exemplary embodiment, as shown in FIG. 1, the step assembly 50 includes a length selector assembly 56. The length selector assembly 56 is coupled to the telescoping step to variably extend the length of the telescoping step 59 as telescoping step 59 extends outwardly from the primary step rail members 52.

The step assembly 50 further includes a stop block 54. Shown in FIG. 1, the stop block 54 is coupled to a corresponding primary step rail member 52.

Operatively, the stop block 54 abuts against the edge of the tailgate 10. As it abuts, the stop block 54 supports the corresponding primary step rail member 52 at a predetermined angle relative to the edge of the tailgate 10 as discussed above. In this manner, in one exemplary embodiment, the stop block 54 permits the step assembly 50 to extend outwardly from the tailgate step frame 70 at a predetermined angle relative to the inside mounting surface 11 of the tailgate 10.

Figure 2:
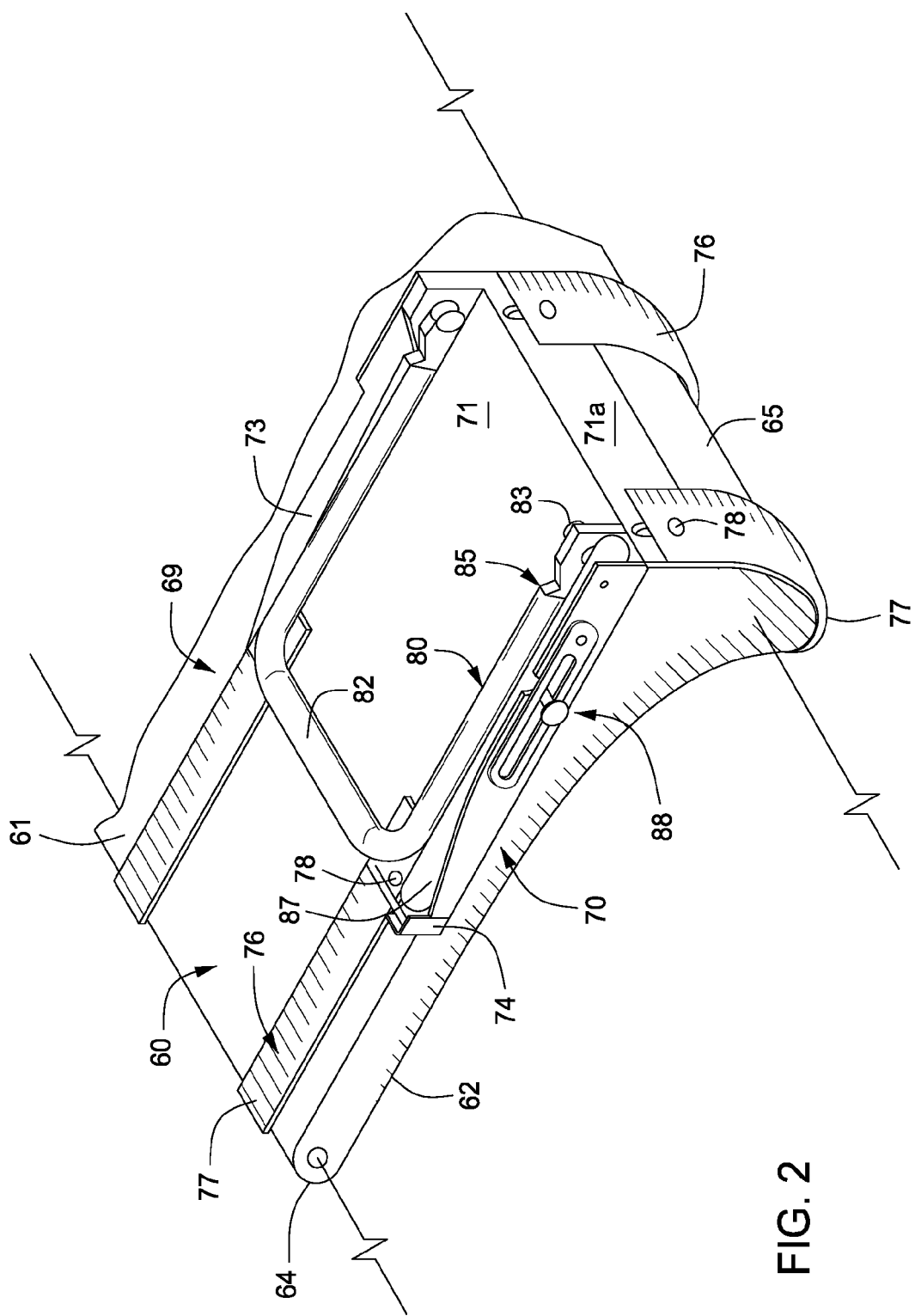
FIG. 2 is a schematic view from the side of another exemplary embodiment of a step device in a stowed position, the step device including a plurality of strap mounting assemblies for compressively fitting on the tailgate without structurally altering the tailgate.

In particular with reference to FIG. 2, there is illustrated a depiction of one exemplary embodiment of a step device 69. As shown in FIG. 1, the step device 69 is coupled to a tailgate 60. In operation, the step device 69 facilitates stepping onto the tailgate 60 without structurally altering the tailgate 60 such as among others drilling holes, denting, or recessing a step assembly within the tailgate 60.

As shown, the tailgate 60 includes an inside surface 61, an outside surface 62, a top edge 65 and a bottom edge 64. As the tailgate 60 is closed to enclose a storage bed, such as a truck bed, the outside surface 12 is exposed to align with the surrounding autobody. FIG. 2 shows the tailgate 60 open to expose a storage bed (not shown), the inside surface 61 provides a mounting surface for a tailgate step frame 30 of the step device 69.

Referring to FIG. 2, the step device 69 is coupled to the tailgate 60. The step device 69 generally includes a tailgate step frame 70 and a step assembly 80. As shown, the step assembly 80 is rendered in a stowed position. Accordingly, the step assembly 80 is positioned close to the tailgate step frame 70 to provide a compact profile for storage as the step assembly 80 is not in use. As the tailgate 60 is closed to enclose the storage bed, the step device 69 in the stowed position provides a compact profile that does not interfere with the contents positioned about the storage bed.

In one exemplary embodiment, the tailgate step frame 70 includes at least one frame element 71. The at least one frame element 71 contacts with the inside surface 61 of the tailgate 60.

For the embodiment of FIG. 2, the tailgate step frame 70 comprises a flat plate with a flanged edge. In particular, the at least one frame element 71 includes a flange portion 71a. In operation, the at least one frame element 71 is disposed on the inside surface 61 whereas the flange portion 71a is positioned against the top edge 65 of the tailgate 60. The frame elements 71 are composed of a rigid material such as a metal, metal alloy or a polymer.

For the embodiment of FIG. 2, the tailgate step frame 70 includes a pair of edge projections 73. Each edge projection 73 supplies added mechanical strength to the tailgate step frame 70. Furthermore, each edge projection 73 permits a stowed step assembly 80 to rest against each edge projection 73 as protection from the elements and potential crushing forces exerted on the tailgate step frame 70 while the step assembly 80 is rendered in a stowed position.

The tailgate step frame 70 further includes a plurality of strap mounting assemblies 76 for releasably coupling the step device 69 to the tailgate 60 without structurally altering the tailgate 60. Each strap mounting assembly 76 is secured to the at least one frame element 71, 71a. The at least one frame element 71, 71a, in turn, positions each strap mounting assembly 76 to a desired location on the tailgate step frame 70 to anchor each strap mounting assembly 76 to the edges 64, 65 of the tailgate 60.

In one exemplary embodiment, the each strap mounting assembly 76 is so dimensioned as to compressively fit on the tailgate 60 thereby anchoring the step device 69 to the tailgate 60. In one exemplary embodiment, each strap mounting assembly 76 features predetermined dimensions to accommodate a compressive fit on a particular tailgate.

Moreover, in one exemplary embodiment, one strap mounting assembly varies in configuration with another strap mounting assembly as illustratively shown in FIG. 2 where the configuration of the strap mounting assemblies 76 at the top edge 65 vary in configuration with the strap mounting assemblies 76 at the bottom edge 64. Inasmuch, one strap mounting assembly can be interchanged for another of different configuration or dimension to optimally fit on a desired tailgate.

As illustratively shown in FIG. 2, each strap mounting assembly 76 includes a strap element 77. The strap element 77 is coupled to the tailgate step frame 70 via a corresponding strap fastener 78. The strap element 77 is configured to conform to the predetermined shape of the tailgate 60. For example, the strap element 77 at the top edge 65 extends from the flange portion 71a along the tailgate top edge 65 toward the outside surface 62 while applying compressive forces to the tailgate 60. Similarly, the strap element 77 at the bottom edge 64 extends from the frame element 71 along the tailgate bottom edge 64 toward the outside surface 62 while applying compressive forces to the tailgate 60.

In one exemplary embodiment, the tailgate step frame 70 includes a support handle 87 coupled to the at least one frame element 71. The tailgate step frame 70 includes a handle locking mechanism 88 for either locking the support handle 87 against the tailgate step frame 70 in a stowed position or locking the support handle 87 in a substantially vertical position in a deployed position. The tailgate step frame 70 further includes a step assembly locking mechanism 74 to secure the step assembly 80 in place as the step device 69 is rendered in a stowed position.

The step device 69 further includes a step assembly 80 having a step 82. The step assembly 80 is pivotally coupled to the tailgate step frame 70 via a hinge element 83 secured to the tailgate step frame 70.

The step assembly 80 further includes a stop block 85. Shown in FIG. 1, the stop block 85 abuts against the flange portion 71a and the top edge 65 of the tailgate 60. As it abuts, the stop block 54 supports the step 82 at a predetermined angle relative to the inside mounting surface 62.

Referring to FIGS. 1 and 2, an exemplary method for stepping on or off a tailgate without structurally altering the tailgate may be appreciated as follows. Initially, a tailgate is opened to position the tailgate flat and in alignment with a storage bed, such as a truck bed. Then, a step device similar to the embodiments described in this disclosure and appended claims is placed on the outside mounting surface of the tailgate. Specifically, a tailgate step frame is placed on the tailgate.

In this exemplary method, the step device includes a tailgate step frame and a step assembly pivotally coupled to the tailgate step frame. The step frame includes a plurality of strap mounting assemblies.

Next, a plurality of strap mounting assemblies are secured along the edge of the tailgate and to the tailgate step frame. In one exemplary method, each strap mounting assembly is compressively adjusted to securedly fit on the tailgate thereby releasably anchoring the step device to the tailgate.

The step assembly is rendered to extend outwardly from the tailgate step frame. Optionally, a support handle is rendered to extend outwardly from the tailgate step frame to facilitate gripping ease. As such, an operator may freely step from the step assembly on to the tailgate to access the storage bed.

To discontinue use, the step assembly is retracted toward the tailgate step frame. The plurality of strap mounting assemblies are removed from along the edge of the tailgate for placement on another desired tailgate according to the procedure mentioned above.

Figure 3:
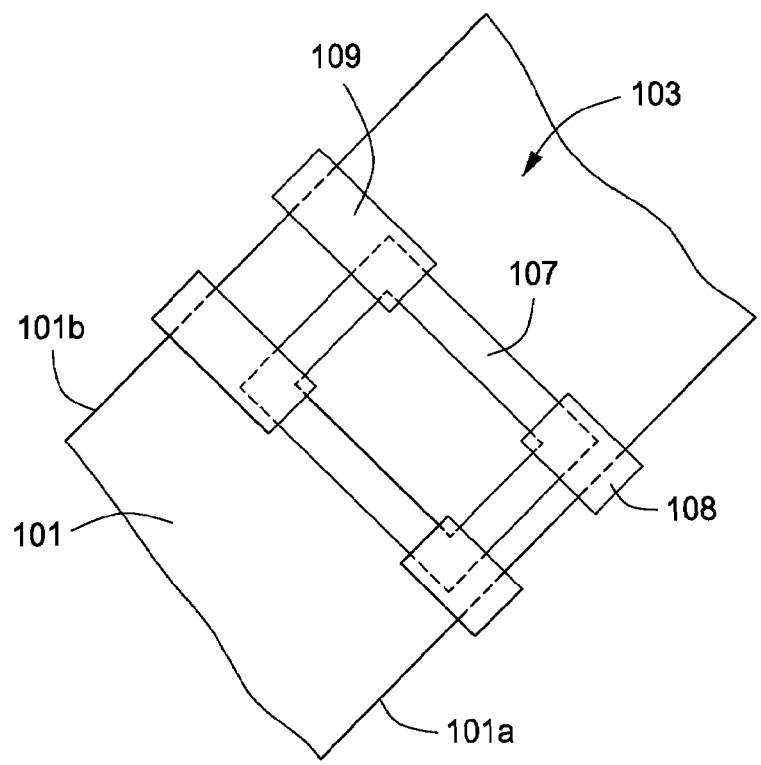
FIG. 3 is a schematic view from the top of one exemplary embodiment of a tailgate step frame coupled to a tailgate; the tailgate step frame configured of a standard size and featuring a plurality of interchangeable strap mounting assemblies where a first strap mounting assembly is configured to removeably anchor to a first edge of the tailgate and a second strap mounting assembly is configured to removeably anchor to a second edge of the tailgate.

In particular with reference to FIG. 3, there is illustrated one exemplary embodiment of a tailgate step frame 103 of a step device. The tailgate step frame 103 is disposed on an inside mounting surface 101 of a tailgate. In general, a plurality of interchangeable strap mounting assemblies are provided by the step device to removably anchor the tailgate step frame 103 to the tailgate.

In the embodiment of FIG. 3, the tailgate step frame 103 is configured as a uniform size or, commonly, "one-size-fits all" configuration for placement on any tailgate. The tailgate step frame 103 includes at least one frame element 107 that can be placed on any position on the inside mounting surface 101 so long as interchangeable strap mounting assemblies are configured to releasably anchor the at least one frame element 107 at such desired position.

Inasmuch, one interchangeable strap mounting assembly can be exchanged for another of different configuration or dimension to optimally fit on a desired tailgate and anchor the at least one frame element 107 at a desired position on the inside mounting surface 101. Illustratively referring to FIG. 3, the plurality of interchangeable strap mounting assemblies includes an interchangeable first strap mounting assembly 108 and a interchangeable second strap mounting assembly 109. As such, to accommodate coupling to the tailgate step frame 103 of uniform size along a desired position on the inside mounting surface 101 the first interchangeable strap mounting assembly 108 is configured to removeably anchor to a first edge 101a of the tailgate. In the same manner, the second interchangeable strap mounting assembly 109 is configured to removeably anchor to a second edge 101b of the tailgate.

In the continuing illustration, a first interchangeable strap mounting assembly may be interchanged for another as the dimensions of the first edge of a tailgate change or the position of the tailgate step frame changes with respect to the inside mounting surface. A second interchangeable strap mounting assembly may also be interchanged for another as the dimensions of the second edge of a tailgate change or the position of the tailgate step frame changes with respect to the inside mounting surface. Those of ordinary skill in the art will readily recognize that in at least one exemplary embodiment, the first interchangeable strap mounting assembly and the second interchangeable strap mounting assembly may be of an identical configuration and size.

Figure 4:
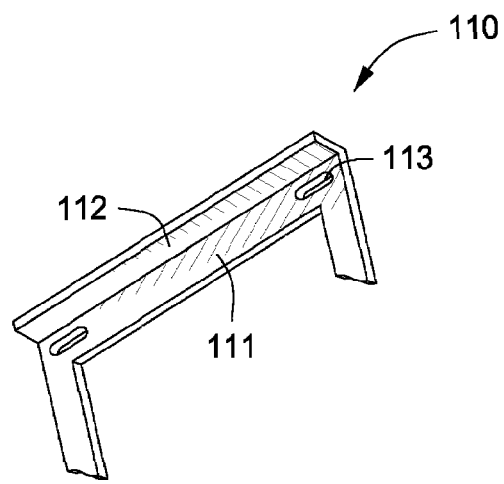
FIG. 4 is a partially cut-away, isometric view from the side of one exemplary embodiment of a tailgate step frame featuring an edge projection extending outwardly from a frame element of the tailgate step frame.

In particular with reference to FIG. 4, there is illustrated one exemplary embodiment of a tailgate step frame 110 of a step device. The tailgate step frame 110 features at least one frame element 111.

The tailgate step frame 110 includes an edge projection 112 extending outwardly from the frame element 111. In one exemplary embodiment, the edge projection 112 is integrally formed from the frame element 111 to provide greater material strength of the overall tailgate step frame 110.

In particular, bent material defining the edge projection 112 supplies added strength to the tailgate step frame 30. Furthermore, the edge projection 112 permits a stowed step assembly to rest against the edge projection 112 as protection from the elements and potential crushing forces exerted on the tailgate step frame 110 while stowed.

As further shown in FIG. 4, the tailgate step frame 110 includes at least one strap mount 113. The at least one strap mount 113 is configured to securely receive a strap fastener to removably couple a strap mounting assembly to the frame element 111.

Figure 5A:
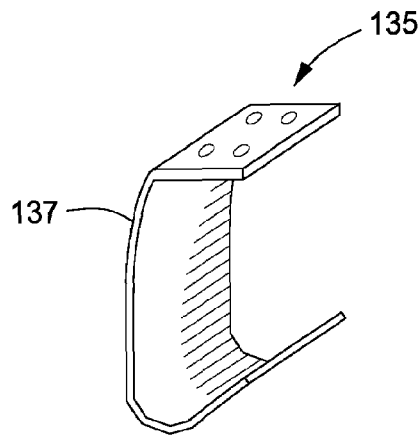
FIG. 5A generally is a cut-away perspective view from the side illustrating one exemplary embodiment of a tailgate step frame removeably anchored to the inside surface of a tailgate via a plurality of strap mounting assemblies.
Figure 5B:
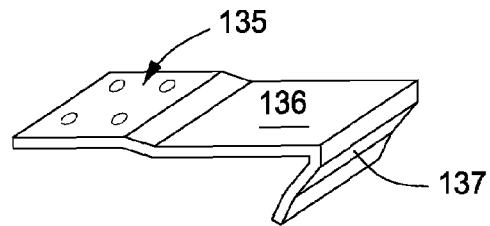
FIG. 5B shows a strap mounting assembly having a strap element configured to conform to the predetermined shape of the top edge of the tailgate.
Figure 5C:
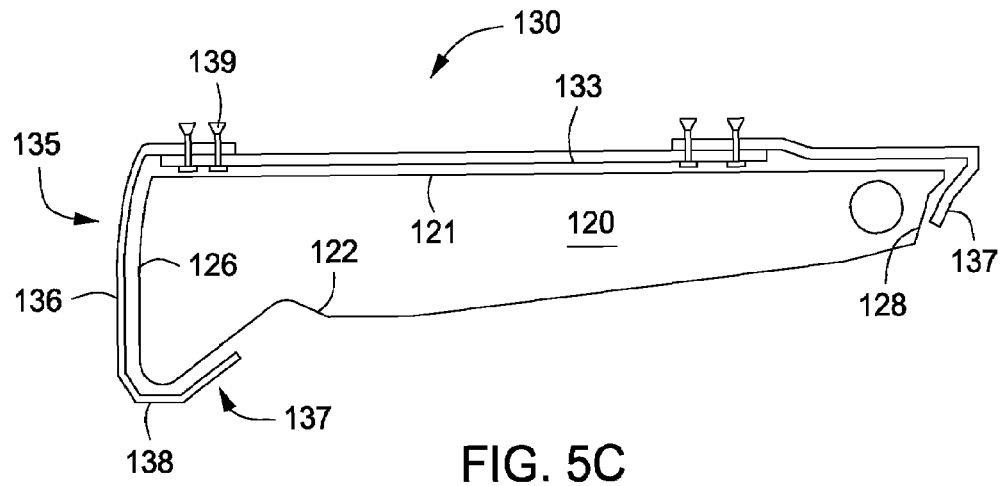
FIG. 5C shows a step mounting assembly having a strap element configured to conform to the predetermined shape of the bottom edge of the tailgate.

In particular with reference to FIG. 5, there is illustrated a depiction of one exemplary embodiment of a tailgate step frame 130. As shown in FIG. 1, the tailgate step frame 130 is coupled to a tailgate 120 via a plurality of strap mounting assemblies 135.

As shown in cross-section from the side, the tailgate 120 includes an inside surface 121, and outside surface 122, a top edge 126, and a bottom edge 128. The tailgate step frame 130 features at least one frame element 133 in contact with the inside surface 121. Moreover, strap fasteners 139 are provided to interchangeably couple a variety of strap mounting assemblies 135 to the at least one frame element 133 as shown.

FIG. 5A shows a strap mounting assembly 135 having a strap element 136 configured to conform to the predetermined shape of the top edge 126 of the tailgate 120. As shown, in one exemplary embodiment, the distal portion of the strap element 136 defines a locking projection 137. The locking projection 137 applies a resilient compressive force against the outside surface 122. In one exemplary embodiment the locking projection 137 comprises a leaf spring.

Optionally, as shown in FIG. 5, the strap element 136 defines a display portion 138. The display portion 138 is positioned along the outside surface. In operation, the display portion 138 is an interface for receiving merchandising indicia thereon, such as among others a corporate name or logo. Those of ordinary skill in the art will readily recognize other items for placement on the display portion 138 such as a light reflector, colored or chromed accents, VELCRO fasteners, and novelty items.

FIG. 5B shows a step mounting assembly 135 having a strap element 136 configured to conform to the predetermined shape of the bottom edge 128 of the tailgate 120. As shown, in one exemplary embodiment, the distal portion of the strap element 136 defines a locking projection 137.

Figure 6:
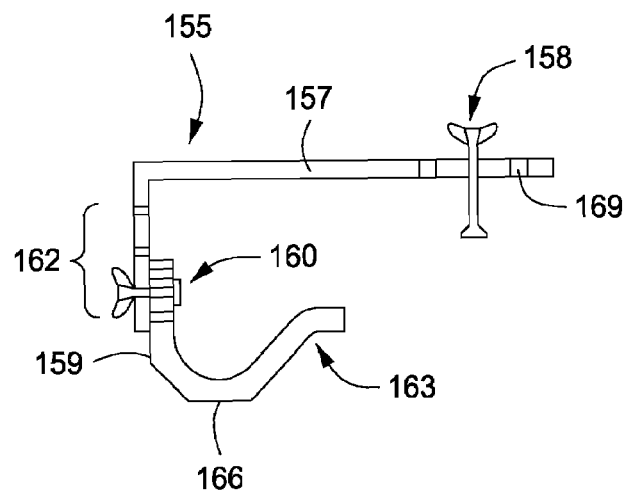
FIG. 6 is a perspective view from the side of an adjustable strap mounting assembly of one exemplary embodiment of a step device, the adjustable strap mounting assembly including an adjustable clamp assembly to permit the adjustable strap mounting assembly to compressively fit on any desired tailgate.

In particular with reference to FIG. 6, there is illustrated a depiction of one exemplary embodiment of an adjustable strap mounting assembly 155 of one exemplary embodiment of a step device. In general, the adjustable strap mounting assembly 155 is configured to compressively fit on any desired tailgate.

Generally, similar to those embodiments described above, the step device includes a tailgate step frame and a step assembly pivotally coupled to the tailgate step frame. The tailgate step frame is disposed on a tailgate to releasably anchor the step device to the tailgate.

The tailgate step frame includes one frame element in contact with the inside mounting surface of the tailgate. The tailgate step frame includes a plurality of strap mounting assemblies where the at least one frame element positions each strap mounting assembly to anchor to the edge of the tailgate.

At least one strap mounting assembly from the plurality of strap mounting assemblies includes an adjustable strap mounting assembly 155 as shown in FIG. 6. In general, the adjustable strap mounting assembly 155 includes an adjustable clamp assembly 162 for permitting the adjustable strap mounting assembly 155 to effectively apply a compressive force.

Referring to FIG. 6, one exemplary embodiment of an adjustable strap mounting assembly 155 includes a first strap element 157 and a second strap element 159. The first strap element 157 and the second strap element 159 are collectively very similar to the strap element mentioned above as they collectively engage with the inside and outside mounting surfaces as well as the edges of a tailgate.

As such, a strap fastener 158 is provided for securing the first strap element 157 to a corresponding frame element of a tailgate step frame. Moreover, as shown in FIG. 6, the first strap element 157 includes a strap position adjustor 169. The strap position adjustor 169 operatively accommodates for variations in tailgate edge distances from the tailgate step frame. Those of ordinary skill in the art will recognize any suitable means widely known in the industry for operatively varying position of a strap mounting assembly with respect to a tailgate step frame.

Moreover, as shown in FIG. 6, the second strap element 159 defines a locking projection 163 as described in detail above. Optionally, the second strap element 159 defines a display portion 166.

Shown in FIG. 6, the adjustable clamp assembly 162 permits the adjustable strap mounting assembly 155 to compressively fit on any desired tailgate. In operation, the adjustable clamp assembly 162 varies the distance by which the first strap element 157 couples to the second strap element 159 via a clamp lock 160. Those of ordinary skill in the art will recognize any suitable means widely known in the industry for operatively varying overall length of a strap element to accommodate any size of tailgate.

While the invention has been particularly shown and described with reference to a preferred embodiment, it will be understood by those skilled in the art that various changes in form and detail may be made therein without departing from the spirit and scope of the invention as defined by the appended claims. These alternate implementations all fall within the scope of the invention.

The invention claimed is:

1. A step device for a tailgate, the tailgate including inside and outside mounting surfaces and edges therebetween, the step device comprising:
    a tailgate step frame,
        the tailgate step frame disposed on the tailgate to releasably anchor the step device to the tailgate,
        the tailgate step frame including
            at least one frame element, the at least one frame element in contact with the inside mounting surface of the tailgate, a plurality of strap mounting assemblies for releasably coupling the step device to the tailgate without structurally altering the tailgate, and each strap mounting assembly is secured to the at least one frame element, the at least one frame element positioning each strap mounting assembly to anchor to the edge of the tailgate, at least one strap mounting assembly of the plurality of strap mounting assemblies includes an adjustable strap mounting assembly that is variably adjustable to compressively fit on the tailgate thereby anchoring the step device to the tailgate; and a step assembly, the step assembly pivotally coupled to the tailgate step frame.

* * * * *